(12) United States Patent
Shen et al.

(10) Patent No.: US 6,947,538 B2
(45) Date of Patent: Sep. 20, 2005

(54) PROCESS, SERVICE COMPUTER, SWITCHING CENTRE, TERMINALS AND PROGRAM MODULES FOR HANDLING INCOMING TELEPHONE CALLS DURING AND ONLINE DATA-NETWORK SESSION BLOCKING A SUBSCRIBER LINE

(75) Inventors: Yuzhong Shen, Stuttgart (DE); Peter Piepkorn, Tamm (DE); Bernhard Kaiser, Vaihingen (DE); Harald Orlamünder, Ditzingen (DE); Ingrid Glasner-Schapeler, Leonberg (DE)

(73) Assignee: Alcatel, Paris (FR)

( * ) Notice: Subject to any disclaimer, the term of this patent is extended or adjusted under 35 U.S.C. 154(b) by 760 days.

(21) Appl. No.: 09/755,150

(22) Filed: Jan. 8, 2001

(65) Prior Publication Data

US 2001/0010691 A1 Aug. 2, 2001

(30) Foreign Application Priority Data

Jan. 12, 2000 (DE) .......................................... 100 00 826

(51) Int. Cl.⁷ ................................................. H04M 3/42
(52) U.S. Cl. .............................. 379/215.01; 379/93.09; 379/93.05; 379/93.35
(58) Field of Search ........................ 370/352; 379/93.09, 379/93.05, 93.35, 215.01

(56) References Cited

U.S. PATENT DOCUMENTS

| 5,805,587 A | 9/1998 | Norris et al. ................ 370/352 |
| 5,809,128 A | 9/1998 | McMullin .............. 379/215.01 |
| 5,946,381 A | 8/1999 | Danne et al. .......... 379/142.07 |
| 6,144,644 A * | 11/2000 | Bajzath et al. .............. 370/259 |
| 6,757,274 B1 * | 6/2004 | Bedingfield et al. ........ 370/352 |

FOREIGN PATENT DOCUMENTS

| EP | 0 856 981 A2 | 8/1998 |
| EP | 0 896 459 A2 | 2/1999 |
| WO | WO 98/36551 A1 | 8/1998 |
| WO | WO 98/53617 A2 | 11/1998 |
| WO | WO 99/34614 A1 | 7/1999 |

\* cited by examiner

*Primary Examiner*—Ahmad F. Matar
*Assistant Examiner*—Quynh H. Nguyen
(74) *Attorney, Agent, or Firm*—Sughrue Mion, PLLC (57) ABSTRACT

The present invention relates to a process and also to a service computer, a switching center, terminals, program modules and memory means with program modules for handling incoming telephone calls for a subscriber line (VA1) of a telecommunications network (PSTN) during an online data-network session blocking the subscriber line (VA1). In this process a terminal (TERA) sets up a connection (VA11, VA1, VPOP1) to an online data-network access device (POP) via the subscriber line (VA1). Thereupon the online data-network access device (POP) sends current access data to the terminal (TERA), which the terminal (TERA) signals to a service computer (SCP) of the telecommunications network. If a switching center (SW1) of the telecommunications network then detects an incoming call destined for the subscriber line (VA1), the switching center (SW1) then signals the fact that this call is waiting to the service computer (SCP) which supplies at least one predetermined service for the purpose of processing the incoming call. The service may, for example, consist in a message being sent to the terminal (TERA), in which attention is drawn to the incoming call, or in the incoming call being forwarded to an alternative destination (TELA2).

24 Claims, 4 Drawing Sheets

PROCESS, SERVICE COMPUTER, SWITCHING CENTRE, TERMINALS AND PROGRAM MODULES FOR HANDLING INCOMING TELEPHONE CALLS DURING AND ONLINE DATA-NETWORK SESSION BLOCKING A SUBSCRIBER LINE

BACKGROUND OF THE INVENTION

The present invention relates to a process for handling incoming telephone calls for a subscriber line of a telecommunications network during an online data-network session blocking the subscriber line and also to a service computer, a switching centre, a terminal 13 for said process, an access-data-sending program module according to the preamble to and a program module for said process.

If a typical end user sets up an online connection to a data network, in particular to the Internet, with his terminal, customarily with a personal computer, to this end he generally makes use of the services of a public telephone network, also designated as a PSTN (Public Switched Telephone Network). The subscriber then links his terminal, e.g. via a modem or an ISDN adapter (ISDN=Integrated Services Digital Network), to the subscriber line leading to his home and dials at the terminal the number of an access device leading to the Internet. The public telephone network then establishes the connection between the terminal and the access device, so that the subscriber is "online" with his terminal. However, whilst the online session is being maintained via the subscriber line the subscriber can only be reached via the Internet, for example via e-mails. A further connection of third parties to the subscriber, e.g. via telephone, is not possible. A possible communication partner who calls the subscriber then obtains an "engaged" signal.

Of course, before he sets up the online connection the subscriber may possibly set up a call-forwarding service for his subscriber line to an alternative destination for the case where he is engaged ("call forwarding busy"), so that any incoming call during [an] online session is forwarded to an alternative communication partner who then accepts the call in place of the subscriber who is actually wanted. Or, as a further alternative, the call can also be forwarded to automatic answering equipment ("voicemail box") which is present in the public telephone network, and the communication request of the caller is satisfied at least partially. However, in both cases the subscriber receives no information of any kind during his online session that a call for him has been accepted. Moreover, the subscriber has to set up the call-forwarding service laboriously prior to each online session and subsequently has to deactivate it again in just as laborious a manner if he does not wish to forego the acceptance of calls permanently, and in appropriate circumstances he also has to interrogate the voicemail. In addition, with the solution with call-forwarding service that has been presented, major resources of the telecommunications network are occupied, because an incoming call does not only have to be put through to the local switching centre to which the subscriber line pertaining to the subscriber who is surfing the Internet is linked but also has to be put through from this local switching centre to the automatic answering equipment.

SUMMARY OF THE INVENTION

The object of the invention is therefore to handle incoming telephone calls for a subscriber line of a telecommunications network comfortably and efficiently while the subscriber line is blocked by an online data-network session of a terminal.

This object is achieved by a process for handling incoming telephone calls for a subscriber line of a telecommunications network while an online data-network session is blocking the subscriber line, by a service computer, a switching centre, a terminal and a program module for use in the process, all as more fully described below and claimed hereafter.

The idea underlying the invention is that, firstly, an online connection to an access device of an online data network, in particular of the Internet, is set up in known manner via a subscriber line of a public telecommunications network by a subscriber with a terminal, for example with a personal computer, and subsequently the access device sends off to the terminal the access data required for the actual Internet access. In accordance with the invention, the terminal then signals these access data to a service computer of the telecommunications network, which with the aid of these access data can provide services for the purpose of handling incoming calls for the subscriber line which is now occupied by the online connection. If a call for the occupied subscriber line is then received, the switching centre of the telecommunications network, which by reason of the occupancy cannot put the call through, informs the service computer that a call is waiting. To this end, with a view to triggering the message, a so-called trigger point in the switching centre in the call-control system thereof, for example, is set permanently or each time the online connection is set up. The switching centre may be, for example, a local switching centre which operates the subscriber line or may be any other switching centre of the telecommunications network which recognises that the call for the subscriber line cannot be put through. The service computer then supplies a predetermined service for handling the call that cannot be put through. In this case it proves to be particularly advantageous that the call from the switching centre does not have to be routed onward by the switching centre to a particular destination from the outset but is firstly held by the switching centre in queueing condition. As a result, on the one hand the call does not constitute a burden on any further resources whatsoever in the telecommunications network, and on the other hand the call can be subjected to further processing in one of the following variants.

The service computer may, for example, send a message to the terminal via the online data network to the effect that a call for the subscriber is waiting. The subscriber can then, for example, break off his online session and accept the waiting call. In this process no further network resources whatsoever are required for a possible forwarding of the waiting call.

The service computer may also instruct the switching centre to forward the call to a predetermined alternative destination, for example to a voicemail box within the telecommunications network or to a mobile-telephone terminal owned by the subscriber. In particular, if the call is not at first held in readiness by the local switching centre operating the occupied subscriber line but by a switching centre situated upstream of this switching centre, valuable resources of the telecommunications network are conserved in the course of subsequent forwarding of the call by the switching centre, since the call simply does not at first get as far as the local switching centre.

In another variant the service computer can instruct the switching centre to forward the call into the online data network as a so-called Voice-over-Internet-Protocol call (VoIP) via a so-called gateway. Said online data network then routes the VoIP call back again to the terminal which then accepts the VoIP call within the context of the online session running there. The subscriber can consequently be reached without elaborate call forwarding and without his online session being interrupted.

Although the variants of the call-handling described above can be set permanently in the service computer in accordance with the wishes of the subscriber, it is also possible for a selection menu to be sent by the service computer to the terminal pertaining to the subscriber via the online data network, from which the subscriber then selects one of the aforementioned variants. The terminal then informs the service computer which variant the subscriber has selected, in order that said service computer can supply the desired service. Accordingly, a whole package of services is offered to the subscriber in a convenient and comfortable manner.

In this way it may in fact be predetermined that whenever a call for the subscriber line which is occupied—by the online connection or by some other call connection—comes in at the switching centre the switching centre queries the service computer about a service for handling the incoming call. In another variant of the invention, however, the service computer notes whether the subscriber line is blocked by an online connection, for example after receiving the current access data of the terminal, and instructs the switching centre to signal incoming calls to the service computer during the current online connection. Then the service computer is burdened only by querying of the switching centre when the subscriber line is blocked by an online session and not when the subscriber line is occupied by some other call connection.

Furthermore, the switching centre can signal to the service computer when the terminal has terminated an online session, so that the service computer can erase the access data that are now no longer current and no longer used, for the purpose of saving memory space.

BRIEF DESCRIPTION OF THE DRAWINGS

The invention and its advantages will be presented in the following on the basis of embodiments with the aid of the drawings.

DETAILED DESCRIPTION OF THE INVENTION

Figure 1:
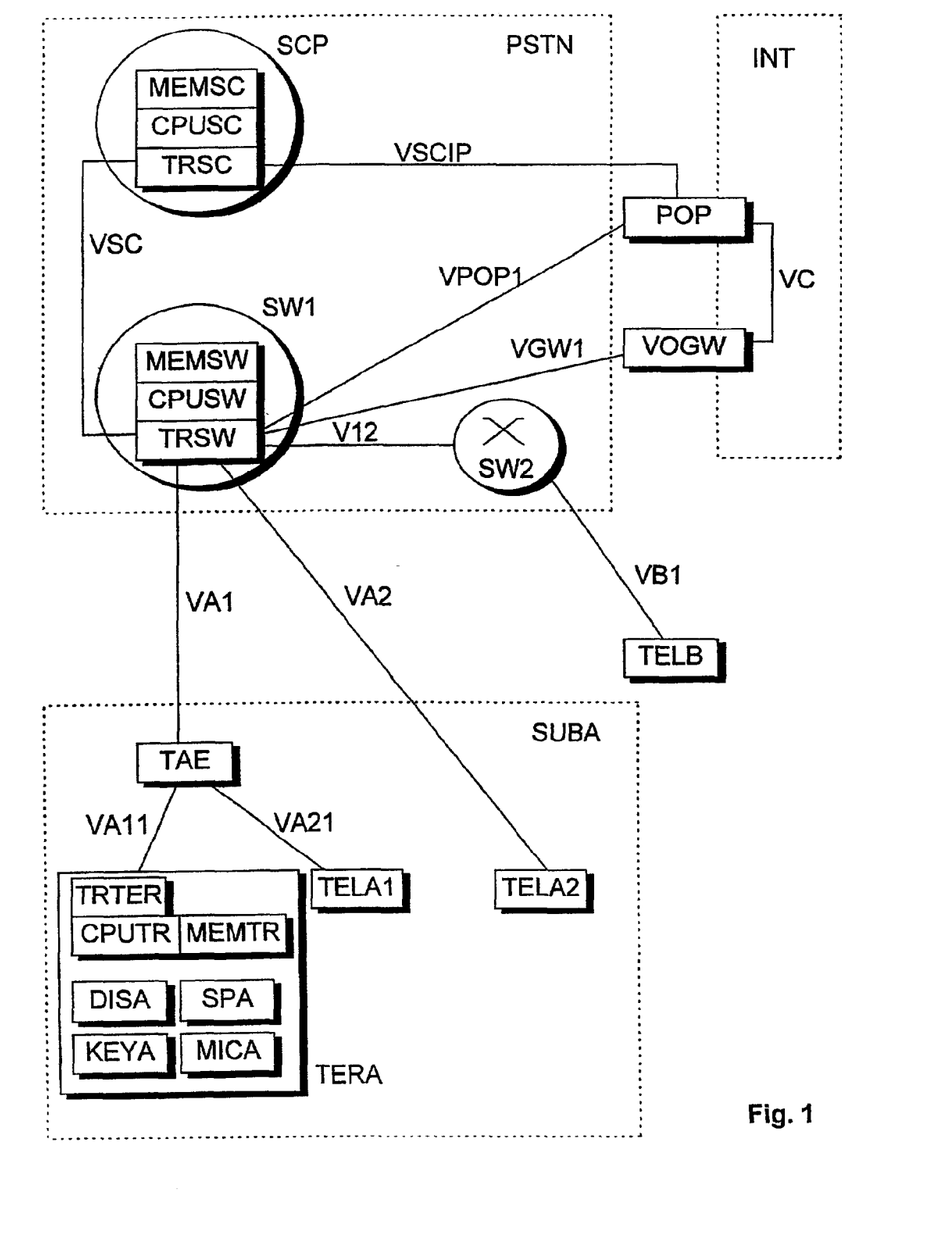
FIG. 1 shows an arrangement for executing the process according to the invention, with an embodiment of a terminal TERA according to the invention, an embodiment of a switching centre SW1 according to the invention and also an embodiment of a service computer SCP according to the invention.
Figure 2:
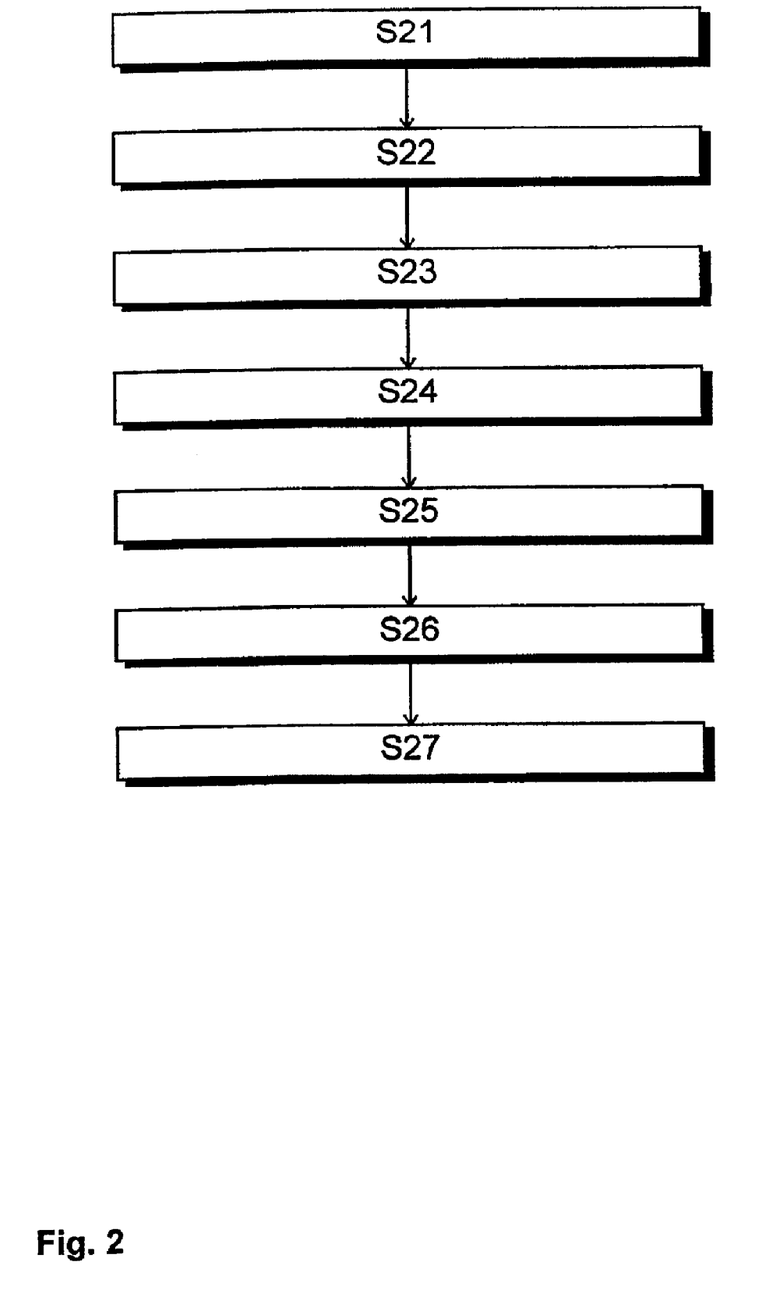
FIG. 2 shows a flow chart of the process according to the invention.
Figure 3:
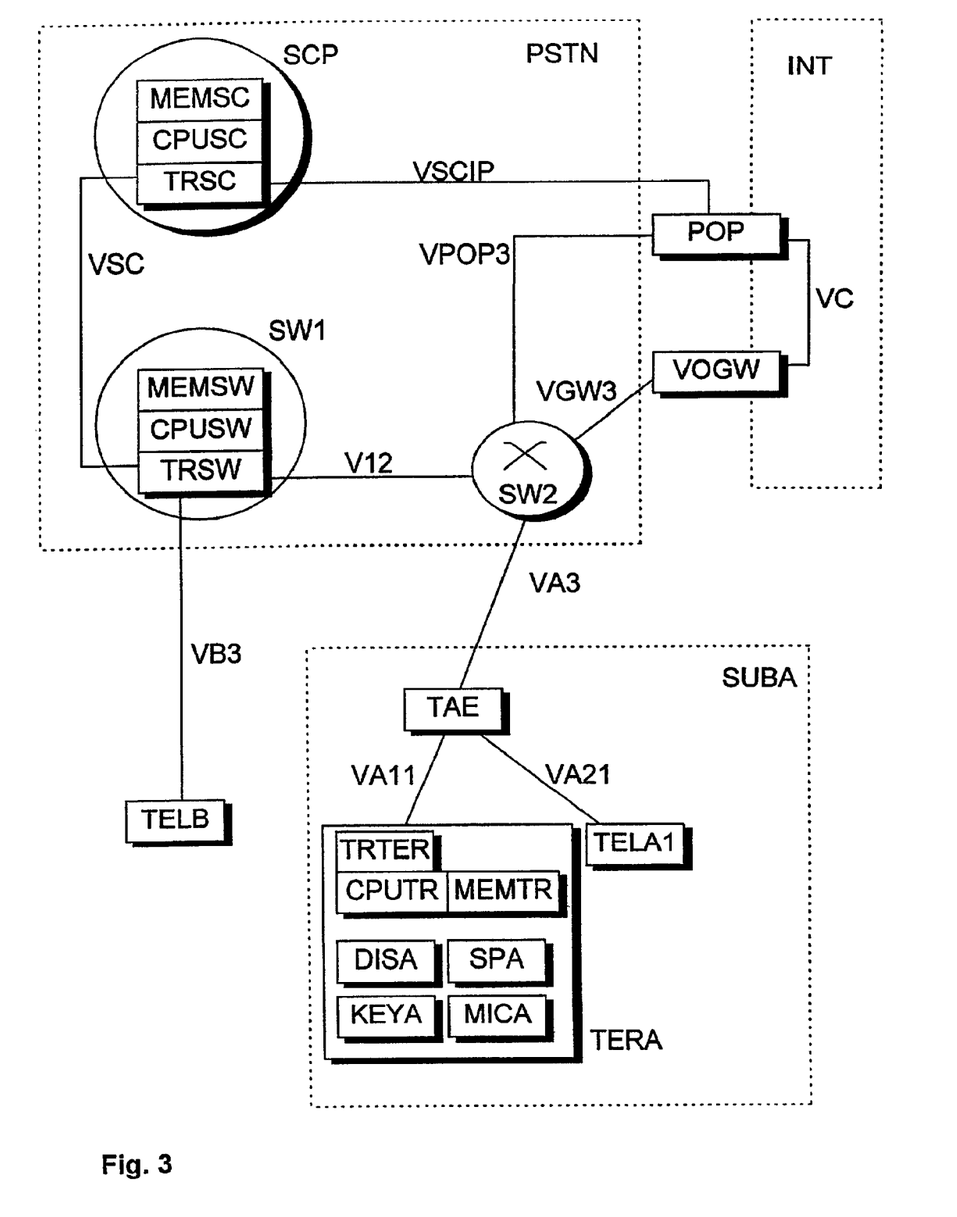
FIG. 3 shows substantially the arrangement from FIG. 1, the components known from FIG. 1 being, in part, connected to one another in a different way.
Figure 4:
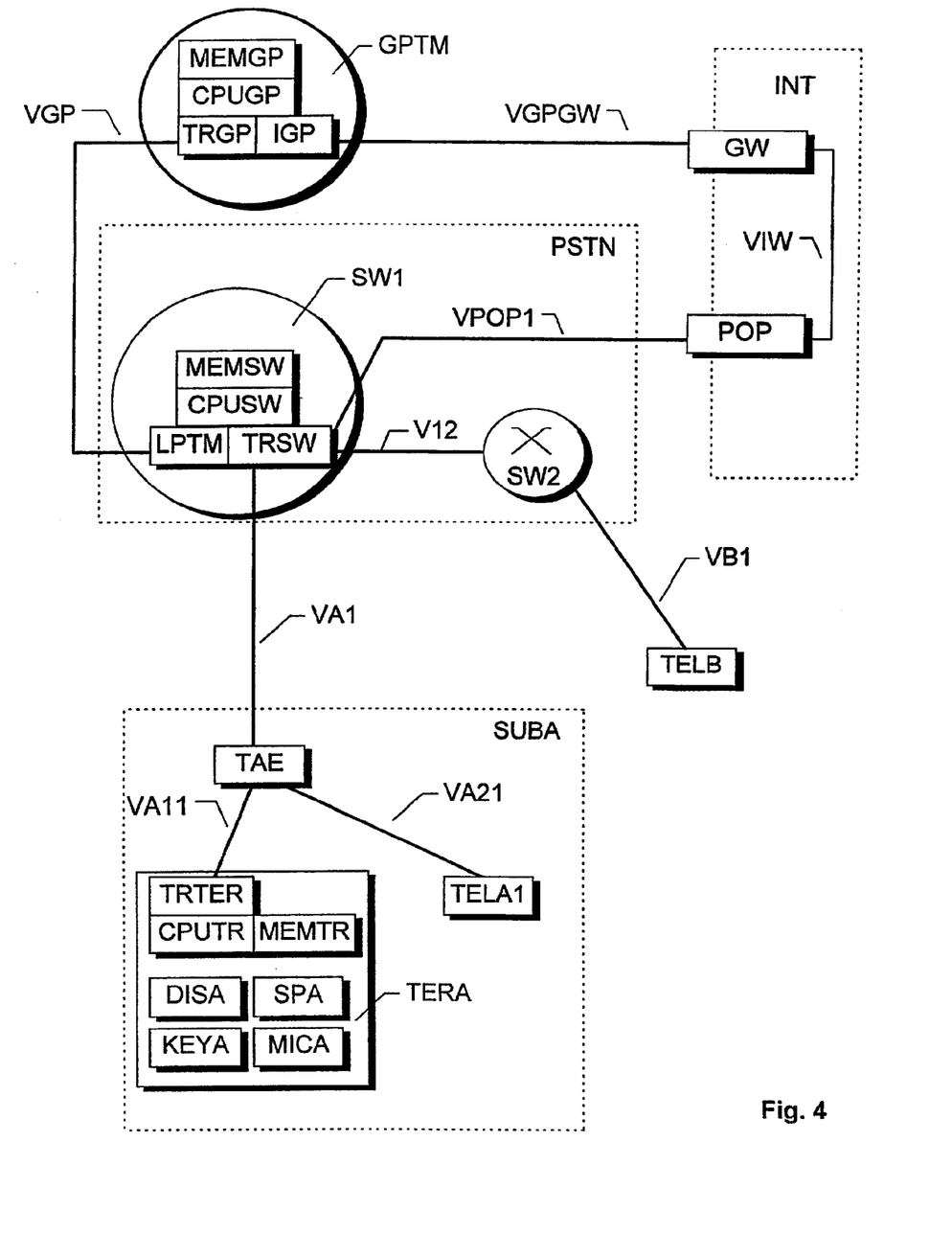
FIG. 4 likewise shows substantially the arrangement from FIG. 1, but instead of the service computer SCP an embodiment of a service computer GPTM according to the invention.

FIGS. 1, 2 and 3 show embodiments that are based on a so-called Intelligent Network; FIG. 4 shows an embodiment that, for example, may be based on the Internet or on an Intranet.

Represented in FIG. 1 is an exemplary arrangement with which the invention can be executed. FIG. 1 shows a telecommunications network PSTN, an online data network INT and also terminals of a subscriber SUBA, indicated in each case by a dotted box. The subscriber SUBA has at his disposal a terminal TERA according to the invention as well as two further terminals TELA1 and TELA2 which may be, for example, fixed-network telephones or mobile telephones. The terminal TERA according to the invention is connected via a subscriber line VA11 to a subscriber connecting jack TAE. The terminal TELA1 is connected to the subscriber connecting jack TAE via an alternative connecting line VA21. The terminal TERA is, for example, a personal computer. However, the terminal TERA may also be a mobile-telephone terminal or a fixed-network telephone with which, in each case, access to the Internet is possible. The terminal TERA exhibits a connection means TRTER which may be, for example, a modem or an ISDN adapter. With the connection means TRTER the terminal TERA can set up a connection to the online data network INT via the telecommunications network PSTN. Moreover, the terminal TERA exhibits a control means CPUTR and also a memory means MEMTR. The control means CPUTR is, for example, a processor with which program code can be executed that is stored in the memory means MEMTR. The memory means MEMTR is, for example, a fixed disc or RAM chips. Moreover, the terminal TERA exhibits a display means DISA and also an input means KEYA. The display means DISA is, for example, a computer monitor or an LCD display (Liquid Crystal Display). The input means KEYA may be a keyboard or a mouse. Moreover, the terminal TERA exhibits a loudspeaker SPA and also a microphone MICA, with which voice output and voice input, respectively, are possible.

Of the telecommunications network PSTN, which, for example, may be an ISDN telecommunications network (ISDN=Integrated Services Digital Network) or a mobile-telephone network, a switching centre SW1 according to the invention, a switching centre SW2 and also a service computer SCP according to the invention are shown as being representative of further devices which are not shown in FIG. 1. The switching centres SW1 and SW2 are connected to one another via a connecting line V12. The connecting line V12 may be a channel group between the two switching centres. But it is also possible for the connection V12 to be routed via further switching centres which are not represented in FIG. 1. The switching centre SW1 and the service computer SCP are connected to one another via a connection VSC. The connection VSC is a connection which is preferably routed via a signalling channel or via a signalling network. Such a signalling network is, for example, the Central Signalling System No. 7. However, the connection VSC may also be routed via a so-called VPN (Virtual Private Network) which may be a private logical network based on the telecommunications network PSTN or on the Internet INT. Of the switching centre SW1, several essential components are shown in exemplary manner, namely a connection means TRSW and also a control means CPUSW and a memory means MEMSW. With the connection means TRSW the switching centre SW1 may set up, on the one hand, data links and voice links to subscribers or to other switching centres. On the other hand, the connection means TRSW may also set up signalling connections such as, for example, the connection VSC to the service computer SCP. The control means CPUSW is a processor or a group of processors which can execute commands that are stored in the memory means MEMSW. The control means CPUSW controls the functions of the switching centre SW1 and in the process exerts an influence on, for example, the functions of the connection means TRSW. The connection means TRSW, the control means CPUSW and the memory means MEMSW are mutually connected by connections which are not shown in FIG. 1. Moreover, the switching centre SW1 may exhibit further subassemblies, for example a coupling network or an interface to a Network Management System. The switching centre SW2 may be equipped internally in the same way as the switching centre SW1. The switching centre SW2 may, however, also be a conventional, known switching centre.

The service computer SCP exhibits a connection means TRSC and also a control means CPUSC and memory means MEMSC. The service computer SCP may be a server that is operated by a UNIX operating system or by a Windows NT operating system. The control means CPUSC is a processor or a cluster of processors which executes the commands of the operating system that is stored in the memory MEMSC. Moreover, in the memory means MEMSC, which, for example, comprises a fixed disc or RAM chips, program-code sequences may be stored which are executed by the control means CPUSC. The control means CPUSC also influences the functions of the connection means TRSC with which, for example, the aforementioned connection VSC can be set up. The service computer SCP also exhibits further subassemblies which are not represented in FIG. 1, for example a monitor, a keyboard and a mouse. The service computer SCP may also operate further switching centres besides the switching centre SW1.

The service computer SCP is preferably—but not necessarily—a service computer of an Intelligent Network, a so-called Service Control Point (SCP). The switching centre SW1 is then a service switching centre which is also designated as a Service Switching Point. The telecommunications network PSTN acting as an Intelligent Network may in this case also comprise further components, for example a so-called Service Management Point (SMP), with which the services of the Intelligent Network are controlled, as well as a so-called Service Creation Environment (SCE), with which services for an Intelligent Network can be generated. The service computer SCP supplies services for the switching centre SW1 and also for further switching centres which are not represented but which are equipped similarly. Such a service is, for example, the known Freecall service (call numbers beginning with "0800"). Although the switching centre SW1 and the service computer SCP can meet the requirements of an Intelligent Network, according to the invention they may also interact in a free manner defined by the proprietor. The connection VSC is then routed, for example, via a Local Area Network (LAN). Such a proprietary interaction can also be defined if the switching centre SW1 and the service computer SCP are combined to form a single device, a so-called Service Switching and Control Point (SSCP). The memory means MEMSW then additionally performs the functions of the memory means MEMSC, the control means CPUSW performs the functions of the control means CPUSC, and the connection means TRSW performs the functions of the connection means TRSC.

Of the online data network INT, merely the access device POP and also a gateway VOGW are represented. The online data network INT is preferably the Internet. The further infrastructure of the data network INT—for example servers, routers, gateways and such like—are not represented in FIG. 1, for reasons of simplicity.

A typical process sequence will now be presented in the following on the basis of the arrangement from FIG. 1 with the aid of the flow chart from FIG. 2.

In a step S21 the subscriber SUBA sets up a connection to the access device POP of the online data network INT with his terminal TERA. To this end, the subscriber SUBA enters on the input means KEYA the subscriber number of the access device POP. Via the connecting line VA11 and the subscriber line VA1 the terminal TERA thereupon sets up a connection to the switching centre SW1. With the aid of the subscriber number of the access device POP the switching centre SW1 then completes the desired connection of the subscriber SUBA, and to this end sets up the further connection VPOP1 to the access device POP. The access device POP thereupon sends current access data to the terminal TERA in a step S22. The access data comprise, in particular, an address via which the subscriber terminal TERA can be reached from the online data network INT. If the online data network INT is the Internet, the Dynamic Host Configuration Protocol (DHCP), for example, is employed as such a process. In the DHCP process an Internet address is allocated dynamically which is valid only for the current online session. If the Internet address is not allocated exclusively to the terminal TERA but can also be used for further terminals, the access device POP also sends a further identifier, a so-called port-number, with which the terminal TERA can be uniquely addressed from the online data network INT. With the aid of the access data that are now available, the devices of the online data network INT can be reached via the terminal TERA. To this end, a so-called browser, for example a WAP browser (WAP=Wireless Application Protocol) or a Netscape Navigator, is executed by the control means CPUTR, with which data received from the Internet can be evaluated and displayed.

However, by virtue of the online connection to the online data network INT the subscriber line VA1 pertaining to the subscriber SUBA is blocked. In order that a caller who would like to reach the subscriber SUBA via the subscriber line VA1 does not hear only an engaged signal, the terminal TERA sends the current access data to the service computer SCP in a step S23. To this end, the control means CPUTR executes a program that is stored in the memory MEMTR. This program, which may be, for example, a so-called Java applet, then sends off a message with the access data and also with the subscriber number of the subscriber line VA1, addressed to the service computer SCP. This message is firstly sent to the switching centre SW1 via the subscriber line VA1 and then to the access device POP via the connection VPOP1. On the basis of the address of the service computer SCP that is contained in the message, for example by way of the return address which is required conventionally, the message can then be sent either directly from the access device POP to the service computer SCP on the connection VSCIP or indirectly over the online data network INT via a connection which is not represented in FIG. 1. In addition to the access data for the online data network INT, the message may also contain a password which protects against improper use of the service according to the invention. The service computer SCP now stores the access data and the subscriber number from the message in its memory means MEMSC and is therefore notified which current access data the terminal TERA can be reached under via the online data network INT. In the possible case where the access device POP carries out a translation of the address of the terminal TERA, the translated address is entered into the message by the access device POP, so that the service computer SCP receives those access data under which the terminal TERA can be addressed.

If the subscriber line VA1 is an ISDN subscriber line or a radio link to a mobile-telephone network, in one variant of the invention the terminal TERA can also send the access data to the switching centre SW1 via a signalling channel, a so-called D-channel or a service channel. The switching centre SW1 then routes these access data onward to the service computer SCP in the form of a service message on the connection VSC.

If another subscriber now wishes to reach the subscriber SUBA, for example by making a call to the subscriber SUBA via the terminal TELB, the subscriber firstly enters the subscriber number of the subscriber line VA1 at the terminal TELB, so that the terminal TELB can set up a connection VB1 to the switching centre SW2. The latter then establishes the connection V12 to the switching centre SW1. However, the switching centre SW1 cannot put the call through to the subscriber connecting device TAE, since the terminal TERA is blocking the subscriber line VA1 with its online session. Therefore in a step S24 the switching centre SW1 signals to the service computer SCP the fact that a call for the subscriber line VA1 is waiting.

The service computer SCP thereupon supplies a predetermined service in a step S25 for the purpose of processing the call that has come in. In this process the service computer SCP sends, for example with the aid of the access data of the terminal TERA that are saved in the memory MEMSC, a message about the connection VSCIP, the access device POP, the connection VPOP1 and the connection VA1 to the terminal TERA, in which attention is drawn to the fact that a call has come in. This message is then displayed by the terminal TERA on the display means DISA. But the message may also be, for example, Java code which can be executed by the browser that is running on the terminal TERA. The subscriber SUBA can then, for example, break off his online connection to the online data network INT, so that the switching centre SW1 can put through the call that has come in to the subscriber line VA1. The subscriber SUBA can accept the call, for example via the terminal TELA1 and the connecting line VA21.

However, it is also possible for the service computer SCP to send an instruction to the switching centre SW1 via the connection VSC, in which it instructs the switching centre SW1 to put the incoming call through to the terminal TELA2 pertaining to the subscriber SUBA via the subscriber line VA2. The switching centre SW1 then routes the call onward to the terminal TELA2. The subscriber SUBA can consequently continue to remain online and nevertheless accept a call via his second terminal TELA2. It may, for example, be the case that the subscriber line VA1 is routed via a line-conducted network, whereas the subscriber line VA2 is routed via a mobile-telephone network.

In particular, if the subscriber SUBA does not have a second terminal TELA2 at his disposal it is very advantageous if the service computer SCP instructs the switching centre SW1 to route the call that has come in onward to the terminal TERA via the online data network INT. The switching centre SW1 then firstly establishes a connection VGW1 to the gateway VOGW. The gateway VOGW can convert voice messages or voice signals coming from the telecommunications network PSTN into conventional digital data messages on the online data network INT. Conversely, the gateway VOGW converts data messages originating from the online data network into voice signals or voice messages. The gateway VOGW establishes a connection VC to the access device POP via the online data network INT. The connection VC may be routed via various devices which are not represented in FIG. 1, for example servers and routers pertaining to the online data network INT. The access device POP then sends voice-data messages received from the gateway VOGW to the terminal TERA via the connections VPOP1 and VA1. The terminal TERA then outputs these messages via its loudspeaker SPA. In the reverse direction the terminal TERA receives speech via the microphone MICA, converts this speech into data, and sends these data to the access device POP. The access device POP relays the voice messages to the gateway VOGW, which generates speech or voice messages therefrom. These voice messages then reach the terminal TELB via the connection VGW1, via the switching centre SW1, via the connection V12 and via the switching centre SW2. In this way the subscriber SUBA can, on the one hand, exchange data with the online data network INT but can, on the other hand, be reached at any time for voice communication.

As a reaction to a call that is waiting in the switching centre SW1 the service computer SCP can also instruct the switching centre SW1 to break off or to interrupt the online data-network session blocking the subscriber line VA1 and to signal the incoming call on the subscriber line VA1. In the case of an interruption, the switching centre SW1 firstly puts the connection VPOP1 in a queueing condition. In the case of a disconnection, this step may be dispensed with. The switching centre SW1 then sends a call signal on the subscriber line VA1. The subscriber SUBA1 can then accept the incoming call via his terminal TELA1 or even via the terminal TERA. If the online session should only have been interrupted by the new call which has now been accepted, the switching centre SW1 re-establishes the originally existing online connection VA11, VA1, VPOP1 after termination of the interim call connection.

In the case of a call that is waiting in the switching centre SW1 the service computer SCP can also instruct the terminal TERA to break off or to interrupt the online data-network session blocking the subscriber line VA1. When the terminal has executed this instruction, the switching centre SW1 signals the incoming call on the subscriber line VA1 and puts the call through to the subscriber line VA1 when the call is accepted by the terminal TERA or by the terminal TELA1. If an interruption of the online data-network session has been configured, after termination of the call that has been put through in the interim the terminal TERA can resume the online data-network session by setting up the online connection VA11, VA1, VPOP1 again.

Which of the services that have already been described is supplied by the service computer SCP can be defined by an appropriate preconfiguration in the memory MEMSC. Such a configuration can, for example, be configured remotely by a Network Management System or can be set from the terminal TERA via an HTML interface (HTML=HyperText Markup Language) of the service computer SCP, which can be reached from the terminal TERA via the online data network INT, and the HTML data of which can be displayed by means of a browser in the terminal TERA.

However, in a particularly comfortable variant of the invention the service computer SCP firstly sends a selection menu to the terminal when a call is waiting for the blocked subscriber line VA1, by means of which selection menu a selection of possible follow-up services is offered with a view to processing the incoming call. The service computer SCP can send this selection menu, for example in the form of a message, via the connection VSCIP to the access device POP and then further via the connection VPOP1, the switching centre SW1, the subscriber line VA1 and the connecting line VA11 to the terminal TERA. The terminal TERA then displays the selection options contained in the message with the aid of a program that is stored in the memory means MEMTR and executed by the control means CPUTR.

Instead of a simple message with selection options, the service computer SCP can also send a program that is capable of being evaluated by the control means CPUTR to the terminal TERA. The program may, for example, be written in the page description language HTML and/or in the Java programming language. The terminal TERA displays the selection options in the form of a selection menu on the display device DISA with the aid of a browser or a Java interpreter. If the subscriber SUBA then makes a selection by entering an input command via the input means KEYA, the terminal TERA accepts this input in a step S26. In a step S27 the terminal TERA then sends the selection that has been made to the service computer SCP on the connecting path VA11, VA1, VPOP1, VSCIP. Said service computer can subsequently supply the service that is desired by the subscriber SUBA. If the subscriber SUBA [sic] has, for example, wished for the waiting call to be routed onward to a telephone-answering machine pertaining to the telecommunications network PSTN, the service computer SCP sends an instruction to the switching centre SW1 via the connection VSC to route the waiting call onward to a telephone-answering module which is not represented in FIG. 1.

The arrangement known from FIG. 1 is substantially represented in FIG. 3. However, in contrast to FIG. 1, in FIG. 3 the terminal TERA pertaining to the subscriber SUBA is linked to the switching centre SW2 via a subscriber line VA3. For reasons of simplification, the terminal TELA2 of the associated subscriber line VA2 pertaining to the subscriber SUBA is also dispensed with. Moreover, the terminal TELB is now linked via a subscriber line VB3 no longer to the switching centre SW2 but to the switching centre SW1. Instead of the connection VPOP1 between switching centre SW1 and access device POP, FIG. 3 shows a connection VPOP3 between the switching centre SW2 and the access device POP. Furthermore, the gateway VOGW is no longer connected to the switching centre SW1 but rather to the switching centre SW2 via a connection VGW3. On the basis of FIG. 3 it will now be demonstrated that a call does not have to be put straight through to the local switching centre which operates the subscriber line of the subscriber SUBA while said subscriber is blocking his subscriber line by means of an online session.

In the manner already presented, the subscriber SUBA establishes a connection via his subscriber line VA3 and the connection VPOP3 to the access device POP of the online data network INT. As a result, the subscriber line VA3 is blocked for further calls. If the call number of the subscriber connection VA3 is now entered at the terminal TELB, firstly a connection VB3 to the switching centre SW1 is established. In a first variant the switching centre SW1 then sets up the further connection V12 to the switching centre SW2. The switching centre SW2 thereupon signals to the switching centre SW1 the fact that the subscriber line VA3 is occupied. Thereupon the switching centre SW1 can clear down the connection V12 and query the service computer SCP about further instructions for handling the waiting call. In a second variant the switching centre SW1 can also merely execute a query—via a signalling network which is not represented in FIG. 3—at the switching centre SW2 as to whether it is possible for the desired call to be put through to the subscriber SUBA at all. By means of a signalling reply message the switching centre SW2 then communicates to the switching centre SW1 the fact that the subscriber line VA3 is blocked. In this case not even a call connection between switching centre SW1 and the switching centre SW2 is established. In a third variant the switching centre SW1 can ask the service computer SCP directly whether a call to the subscriber SUBA is to be handled in a particular manner. In each of the three cases the service computer SCP can then supply one of the services already described above with the aid of the current access data of the terminal TERA. Such a service may, for example, consist in the service computer SCP sending an instruction to the switching centre SW1 to establish a voice link via the connection V12, the switching centre SW2, the connection VGW3, the gateway VOGW, the connection VC, the access device POP, the connection VPOP3, the subscriber line VA3 and the connecting line VA11 as far as the terminal TERA. On the basis of the last-mentioned examples it becomes very clear that by virtue of the invention the resources of the telecommunications network PSTN are burdened very little if, on account of an online session, a call cannot be put through to a subscriber line. In the example from FIG. 3 the switching centre SW1 is a local switching centre. The switching centre SW1 may, however, also be a transit exchange which switches calls from another telecommunications network for the telecommunications network PSTN, which is not represented in FIG. 3.

If the telecommunications network PSTN exhibits further service computers that are similar to the service computer SCP, it is particularly advantageous if the access data of the subscriber SUBA and also of further subscribers who are not represented in the Figures are collected in a central database which is likewise not represented in the Figures. Such a database may, for example, be a so-called Service Management Point in which the access data of the respective subscribers are saved. The Service Management Point then provides the service computers—inter alia also the service computer SCP—with current access data.

The arrangement known from FIG. 1 is substantially represented in FIG. 4. A variant of the solution without an Intelligent Network will be described in the following on the basis of FIG. 4. Instead of the service computer SCP, in FIG. 4 a service computer GPTM is represented which via a connection means IGP can set up a connection VGPGW to a gateway GW of the online data network INT. The gateway GW is a computer that enables the service computer GPTM to have access to the online data network INT. The so-called Transmission Control Protocol/Internet Protocol (TCP/IP) is preferably used on the connection VGPGW. A so-called firewall which controls the access to the service computer GPTM may also be interpolated into the connection VGPGW. Although the service computer GPTM could, like the service computer SCP, also be a Service Control Point of an Intelligent Network, in the present embodiment shown in FIG. 4 it is an independent server which, regarded logically, is not a direct constituent of the telecommunications network PSTN. Therefore the dotted box indicating the telecommunications network PSTN does not comprise the service computer GPTM. In principle, the service computer GPTM may also perform the services already described within the context of the service computer SCP.

The service computer GPTM may be a computer that is operated by a UNIX operating system or by a Windows NT operating system. The control means CPUGP is a processor or a cluster of processors which executes the commands of the operating system that is stored in the memory MEMGP. Moreover, in the memory means MEMGP, which, for example, comprises a fixed disc or RAM chips, program-code sequences may be stored which are executed by the control means CPUGP. The control means CPUGP also influences the functions of a connection means TRGP with which a connection VGP to a connection means LPTM of the switching centre SW1 can be set up. The service computer GPTM also exhibits further subassemblies which are not represented in FIG. 1, for example a monitor, a keyboard and a mouse. The service computer GPTM may also operate further switching centres besides the switching centre SW1.

The connection VGP may be routed via a channel of a signalling network, for example the Central Signalling System No. 7, but in the embodiment shown in FIG. 4 it is a connection which is routed via the Internet, the online data network INT or via a separate Local Area Network (LAN) and on which transmission takes place with the aid of the Transmission Control Protocol/Internet Protocol (TCP/IP). The connection VGP may also be routed via a Virtual Private Network (VPN). The connection means LPTM and TRGP are each interface modules which are designed for this purpose.

As already presented within the context of steps S26 and S27, the connection means IGP offers the subscriber SUBA a configuration interface on his terminal TERA, via which the subscriber SUBA can select possible follow-up services for the purpose of processing a call that comes in during an online session. The subscriber can, on the one hand, select or parameterize follow-up services permanently via the connection means IGP. On the other hand, the subscriber may log on via the connection means IGP also at the start of an online session and activate one of the services according to the invention.

With a view to setting up an online session, firstly a connection from the terminal TERA to the access device POP is set up in a manner already described, via the connecting line VA11, the subscriber line VA1, the switching centre SW1 and the connection VPOP1, and hence the subscriber line VA1 is blocked. The terminal TERA then addresses the connection means IGP of the service computer GPTM, for example by a program module that is saved in the memory means MEMTR and executed by the control means CPUTR sending the (Internet) address of the service computer GPTM to the access device POP. Thereupon a connection VIW between the access device POP and the gateway GW is set up which then sets up the connection VGPGW. For example, by input of an operator identifier (user ID) and a password at the terminal TERA the subscriber SUBA identifies himself as being authorized for access to the service computer GPTM and also to data that are stored for him in the memory means MEMGP with a view to supplying telecommunications services. The terminal TERA sends operator identifer and password to the service computer GPTM. Furthermore, the terminal TERA also sends current access data obtained from the access device POP to the service computer GPTM. On the basis of the receipt of the access data or also on the basis of a separate item of information sent from the terminal TERA, the service computer GPTM ascertains that the terminal TERA is currently maintaining an online session blocking the subscriber line VA1 and that the subscriber SUBA is ordering a service for handling incoming calls during the online session. The service computer GPTM stores the access data and the activation of the service in the memory means MEMGP.

The service computer GPTM then sends an instruction to the switching centre SW1 to signal to the service computer GPTM the fact that an incoming call destined for the subscriber line VA1 is waiting, so long as the terminal TERA is maintaining the connection to the online data network INT blocking the subscriber line VA1. In response to the instruction the switching centre SW1 sets an appropriate status bit in the memory means MEMSW. The status bit can, for example, be saved within the context of a so-called "call waiting" service which is supplied by the switching centre SW1 as an ISDN service and which is defined by the ITU (International Telecommunication Union). The switching centre SW1 acknowledges the acceptance of the instruction with an acknowledgement signal to the service computer GPTM. The signal is routed by the service computer GPTM to the terminal TERA via the connection VGPGW-VIW-VPOP1-VA1-VA11, so that the subscriber SUBA has the successful activation of the service for handling incoming calls during the online session displayed by the display means DISA, for example. If an error occurs in the course of one of the aforementioned steps, for example if an incorrect password is specified, the service computer GPTM sends to the terminal TERA a negative acknowledgement signal and breaks off the process for activation of the service by the subscriber SUBA. The switching centre SW1 also negatively [ . . . ] to the service computer GPTM in the case of an error and breaks off the process for activation of the service.

If, after activation of the service, a call for the terminal TERA comes in at the switching centre SW1, originating from the terminal TELB for example, the switching centre SW1 checks whether the status bit has been set and, in the affirmative case, sends a message to the service computer GPTM to the effect that a call for the blocked subscriber line VA1 is waiting. The message contains the subscriber number of the subscriber line or another identification digit assigned to the subscriber line, as well as the subscriber number of the terminal TELB, if available. After a possible check in the memory means MEMGP, which is carried out in addition, as to whether the service for the subscriber SUBA has been activated, the service computer GPTM thereupon supplies the selected service and in the process sends a message to the terminal TERA, for example via the online data network INT, to the effect that a call is waiting in the switching centre SW1.

If the online session of the terminal TERA is terminated and in the process the connection between terminal TERA and access device POP is cleared down, the switching centre SW1 sends a message about the termination of the online session to the service computer GPTM and resets the status bit in the memory means MEMSW. The service computer GPTM also resets its online status for the subscriber line VA1 and releases the memory for the access data. By this means it is ensured that the service for incoming calls is only supplied by the service computer GPTM when, in each instance, valid access data have been sent to the service computer GPTM at the start of an online session, the service has been correctly activated by the terminal TERA, and the terminal TERA is also actually online. Accordingly, in the case of the process associated with the embodiment from FIG. 4 the service computer GPTM never operates with access data that are still present from an earlier online session and that have possibly already become invalid in the course of a new online session by virtue of access data that have been re-allocated to the terminal TERA by the access device POP.

The terminal TERA could also log off at the service computer GPTM via the connection over the online data network INT and deactivate the service for incoming calls. However, a deactivation by the switching centre SW1 operates more reliably, since the terminal TERA may also terminate the online session in surprising manner, for example as a result of a so-called computer crash, that is to say when a program error occurs in a program being executed by the control means CPUTR. However, in the case of less demanding requirements in terms of operational reliability, simpler ways of proceeding are also possible, in which, for example, the resetting of the status bit in the switching centre SW1 when the online session is cleared down is dispensed with or in which a clear-down of the online session is signalled to the service computer GPTM not by the switching centre SW1 but by the terminal TERA.

It is also possible for a switching centre which is not connected to the service computer GPTM to be connected upstream of the switching centre SW1, to which the terminal TERA is linked. The services of the service computer and also of the switching centre SW1 for handling incoming calls during the subsequent online session can then, for example, be activated in the following manner:

In the event of "call forwarding busy" a call-forwarding service to a special call number which has been set up in the switching centre SW1 is activated in the switching centre connected upstream. Such an activation process is known as such in the case of the "call forwarding busy" service, a conventional ISDN service, and does not therefore have to be elucidated. If during the subsequent online session a call then comes in for the terminal TERA in the switching centre connected upstream, said switching centre routes the call onward to the special call number of the switching centre SW1. The switching centre SW1 then informs the service computer GPTM via the connection VGP, in the manner described, of the fact that an incoming call destined for the subscriber line VA1 is waiting. The service computer GPTM thereupon sends, for example, a message about the waiting call to the terminal TERA via the online data network INT.

What is claimed is:

1. A process for handling incoming telephone calls subscriber line of a telecommunications network while the subscriber line is busy during an online data-network sessions, wherein a terminal of a subscriber sets up a connection to an access device of an online data network via the subscriber line, and the access device sends current access data to the terminals the process comprising the steps of:

the terminal signaling the current access data to a service computer of the telecommunications network, a switching center of the telecommunications network signaling to the service computer the fact that an incoming call destined for the subscriber line is waiting at the switching center, and the service computer supplying at least one predetermined service for the purpose of processing the incoming call.

2. A process according to claim 1, wherein by way of a predetermined service the service computer sends a message to the terminal in which attention is drawn to the incoming call.

3. A process according to claim 1, wherein by way of a predetermined service the service computer forwards the incoming call to an alternative destination.

4. A process according to claim 1, wherein by way of a predetermined service the service computer forwards the incoming call to the terminal via the online data network.

5. A process according to claim 1, wherein by way of a predetermined service the service computer instructs one of the switching center and the terminal to break off or to interrupt the online data-network session occupying the subscriber line and in that the switching center signals the incoming call on the subscriber line.

6. A process according to claim 1, wherein:

by way of a predetermined service the service computer sends a selection menu to the terminal, by means of which a selection of possible follow-up services for the purpose of processing the incoming call is offered, the terminal ascertains a selection that has been made by an operator in the selection menu, the terminal sends the selection to the service computer, and the service computer supplies the follow-up service defined in the selection.

7. A process according to claim 1, wherein the service computer sends an instruction to the switching center to signal to the service computer the fact that an incoming call destined for the subscriber line is waiting if the terminal has set up the connection to the access device of the online data network via the subscriber line.

8. A process according to claim 1, wherein the switching center signals to the service computer a clear-down of the connection occupying the subscriber line.

9. A process according to claim 1, wherein when a call comes in that is directed to a special call number which has been set up in the switching center, the switching center signals to the service computer the fact that an incoming call destined for the subscriber line is waiting.

10. A service computer of a telecommunications network for handling incoming telephone calls for a subscriber line of the telecommunications network while the subscriber line is busy during an online data-network session of a terminal of a subscriber, the service computer comprising:

a receiver configured in such a way that the service computer of the telecommunications network can receive access data sent from the terminal of the subscriber which the terminal has received from an access device of an online data network in the course of the setting-up of a connection to the online data network via the subscriber line, and further configured such that the service computer can receive a message from a switching center of the telecommunication network in which the switching center signals to the service computer the fact that an incoming call destined for the subscriber line is waiting at the switching center;

a memory configured in such a way that the service computer can store the access data; and a service supply configured in such a way that the service computer can supply at least one predetermined service for the purpose of processing the incoming call with the aid of the access data.

11. A switching center for handling incoming telephone calls for a subscriber line of a telecommunications network while the subscriber line is busy during an online data-network session of a terminal of a subscriber said switching center comprising:

a receiver configured in such a way that the switching center can receive and hold an incoming call destined for the subscriber line while the subscriber line is busy during an online data-network session of the terminal of the subscriber;

a recognition apparatus configured in such a way that the switching center can recognize that the terminal has set up a connection occupying the subscriber line; and a transmitter configured in such a way that the switching center can send a message to a service computer of the telecommunications network if an incoming call destined for the subscriber line is waiting while the subscriber line is busy during an online data-network session of the terminal, wherein the terminal signals access data to the service computer of the telecommunications network to aid in providing services for handling incoming calls for the occupied subscriber line, said access data being sent from an access device to the terminal.

12. A terminal of a subscriber for handling incoming telephone calls for a subscriber line of a telecommunications network while the subscriber line is busy during an online data-network session of the terminal, the terminal comprising:

a receiver configured in such a way that the terminal can receive current access data from an access device of an online data network which the access device sends to the terminal of the subscriber in the course of the setting-up of a connection to the online data network via the subscriber line, and a transmitter configured in such a way that the terminal can send the current access data to a service computer of the telecommunications network, which with the aid of the access data can supply at least one predetermined service for the purpose of processing an incoming call waiting at a switching center due to the online data-network session of the terminal occupying the subscriber line.

13. A terminal of a subscriber for handling incoming telephone calls for a subscriber line of a telecommunications network while the subscriber line is busy during an online data-network session of the terminal, the terminal comprising:

a receiver configured in such a way that the terminal of the subscriber can receive instructions from a service computer of the telecommunications network which, with a view to supplying at least one predetermined service for the purpose of processing the incoming call waiting at a switching center due to the online data-network session of the terminal occupying the subscriber line, the service computer sends off to the terminal with the aid of access data which the service computer has obtained from the terminal after a connection from the terminal to the online data network has been set up via the subscriber line, and execution apparatus configured in such a way that the terminal can execute the instructions.

14. An access-data-sending program module for a terminal of a subscriber for handling incoming telephone calls for a subscriber line of a telecommunications network while the subscriber line is busy during an online data-network session of the terminal, said program module containing program code which can be executed by a processor in the terminal, the program module comprising:

receiving code for receiving from an access device of an online data network current access data which the access device sends to the terminal of the subscriber in the course of the setting-up of a connection to the online data network via the subscriber line, and sending code for sending the current access data to a service computer of the telecommunications network, which with the aid of the access data can supply at least one predetermined service for the purpose of processing an incoming call waiting at a switching center due to the online data-network session of the terminal occupying the subscriber line.

15. A program module for a terminal of a subscriber for handling incoming telephone calls for a subscriber line of a telecommunications network while the subscriber line is busy during an online data-network session of the terminal, said program module containing program code which can be executed by a processor in the terminal, the program module comprising:

receiving code for receiving instructions from a service computer of the telecommunications network which the service computer sends off to the terminal of the subscriber with a view to supplying at least one predetermined service for the purpose of processing the incoming call, which is waiting at a switching center due to the online data-network session of the terminal occupying the subscriber line, with the aid of access data which the service computer has received from the terminal after a connection from the terminal to the online data network has been set up via the subscriber line, and execution code for executing the instructions.

16. A memory storing an access-data-sending program module according to claim 14.

17. A memory storing a program module according to claim 15.

18. A process according to claim 1, wherein the switching center signaling to the service computer the fact that an incoming call destined for the subscriber line is waiting is performed without forwarding the incoming call to the service computer.

19. A service computer according to claim 10, wherein the switching center signals to the service computer the fact that the incoming call destined for the subscriber line is waiting without forwarding the incoming call to the service computer.

20. A switching center according to claim 11, wherein the transmitter is configured in such a way that the switching center can send the message to the service computer if the incoming call destined for the subscriber line is waiting while the subscriber line is occupied by an online data-network session of the terminal without forwarding the incoming call to the service computer.

21. A terminal according to claim 12, wherein the incoming call waiting at the switching center is not forwarded to the service computer.

22. A terminal according to claim 13, wherein the incoming call waiting at the switching center is not forwarded to the service computer.

23. An access-data-sending program module according to claim 14, wherein the incoming call waiting at the switching center is not forwarded to the service computer.

24. A program module according to claim 15, wherein the incoming call waiting at the switching center is not forwarded to the service computer.

* * * * *